(12) United States Patent
Tornetta et al.

(10) Patent No.: US 7,623,519 B2
(45) Date of Patent: *Nov. 24, 2009

(54) RULE BASED ROUTING IN A SWITCH

(75) Inventors: Anthony G. Tornetta, King of Prussia, PA (US); Jason Workman, Bensalem, PA (US); Jerald W. Pearson, Somerdale, NJ (US); James C. Wright, Sewell, NJ (US); Gregory L. Koellner, Medford, NJ (US)

(73) Assignee: Brocade Communication Systems, Inc., San Jose, CA (US)

( * ) Notice: Subject to any disclaimer, the term of this patent is extended or adjusted under 35 U.S.C. 154(b) by 798 days.

This patent is subject to a terminal disclaimer.

(21) Appl. No.: 10/873,547

(22) Filed: Jun. 21, 2004

(65) Prior Publication Data

US 2005/0281196 A1 Dec. 22, 2005

(51) Int. Cl.
*H04J 3/14* (2006.01)
*H04Q 11/00* (2006.01)
*H04B 3/20* (2006.01)
*G06F 15/173* (2006.01)
*G06F 3/00* (2006.01)

(52) U.S. Cl. .................. 370/392; 370/235; 370/359; 370/363; 709/238; 710/1; 710/21

(58) Field of Classification Search .............. 370/464, 370/474, 360, 363, 359, 235; 710/20, 21, 710/1; 709/238

See application file for complete search history.

(56) References Cited

U.S. PATENT DOCUMENTS

| 4,710,868 A | 12/1987 | Cocke et al. |
| 5,455,820 A | 10/1995 | Yamada |
| 5,533,201 A | 7/1996 | Benton et al. |

(Continued)

FOREIGN PATENT DOCUMENTS

EP 0 856 969 A1 8/1998

(Continued)

OTHER PUBLICATIONS

Zoltan Meggyesi, "Fiber Channel Overview," 1994, Research Institute for Particle and Nuclear Physics, pp. 1-10.*

(Continued)

*Primary Examiner*—Dang T Ton
*Assistant Examiner*—Ryan C. Kavleski
(74) *Attorney, Agent, or Firm*—Wong, Cabello, Lutsch, Rutherford & Brucculeri LLP

(57) ABSTRACT

A routing module applies a plurality of routing rules simultaneously to determine routing for a Fibre Channel frame. Each rule independently determines whether the rule applies to the frame as well as a routing result for the frame. The routing result includes a port address, a zoning indicator, and a priority designation that can be used to route the frame over a virtual channel in an interswitch link. A selector chooses between the results returned by the rules. A component receives routing results specifying an ISL group and selects a physical ISL for the frame. An in-band priority determined by the content of the frame header can also be used in place of the priority designation in the routing result.

8 Claims, 9 Drawing Sheets

U.S. PATENT DOCUMENTS

| | | | | |
|---|---|---|---|---|
| 5,771,227 | A * | 6/1998 | Benayoun et al. | 370/235 |
| 5,781,549 | A | 7/1998 | Dai | |
| 5,844,887 | A | 12/1998 | Oren et al. | |
| 5,974,467 | A | 10/1999 | Haddock et al. | |
| 5,983,260 | A | 11/1999 | Hauser et al. | |
| 5,999,527 | A | 12/1999 | Petersen | |
| 6,067,286 | A | 5/2000 | Jones et al. | |
| 6,160,813 | A | 12/2000 | Banks et al. | |
| 6,185,203 | B1 * | 2/2001 | Berman | 370/351 |
| 6,307,855 | B1 * | 10/2001 | Hariguchi | 370/392 |
| 6,335,992 | B1 | 1/2002 | Bala et al. | |
| 6,370,145 | B1 | 4/2002 | Dally et al. | |
| 6,600,744 | B1 * | 7/2003 | Carr et al. | 370/392 |
| 6,765,919 | B1 * | 7/2004 | Banks et al. | 370/401 |
| 6,819,654 | B2 * | 11/2004 | Soloway et al. | 370/238 |
| 7,167,472 | B2 * | 1/2007 | Wu et al. | 370/389 |
| 7,336,617 | B1 * | 2/2008 | Liu | 370/252 |
| 7,369,554 | B1 * | 5/2008 | Modelski et al. | 370/392 |
| 2002/0156918 | A1 | 10/2002 | Valdevit et al. | |
| 2002/0176417 | A1 * | 11/2002 | Wu et al. | 370/389 |
| 2003/0026267 | A1 | 2/2003 | Oberman et al. | |
| 2003/0156586 | A1 * | 8/2003 | Lee et al. | 370/392 |
| 2003/0202474 | A1 | 10/2003 | Kreuzenstein et al. | |
| 2004/0017771 | A1 | 1/2004 | Martin et al. | |
| 2004/0024906 | A1 | 2/2004 | Valdevit et al. | |
| 2004/0081096 | A1 | 4/2004 | Martin | |
| 2005/0100012 | A1 * | 5/2005 | Kaxiras et al. | 370/389 |

FOREIGN PATENT DOCUMENTS

| | | |
|---|---|---|
| EP | 0 959 591 A1 | 11/1999 |
| EP | 1 016 980 A2 | 7/2000 |
| WO | WO 01/67672 A2 | 9/2001 |
| WO | WO 03/017103 A1 | 2/2003 |
| WO | WO 03/017583 A1 | 2/2003 |

OTHER PUBLICATIONS

Gregory L. Frazier & Yuval Tamir, The Design & Implementation of a Multi-Queue Buffer for VLSI Communication Switches, Proceedings of the International Conference on Computer Design, Oct. 1989, pp. 466-471, IEEE, New York, NY.

Kohei Shiomoto, Masayuki Murata, Yuji Oie and Mideo Miyahaha, Performance Evaluation of Cell Bypass Queuing Discipline for Buffered Banyan Type ATM Switches, Proceedings INFOCOM '90, Feb. 25, 2005, pp. 677-685 vol. 2, IEEE, New York, NY.

Erwin P. Rathgeb, Redundancy Concepts for a Large ATM Switching Node, Sep. 21, 1997, XVI World Telecom Congress Proceedings.

Wolfgang Fischer, Oswald Fundneider, Ernst-Heinrich Goeldner & K.A. Lutz, A Scalable ATM Switching System Architecture, IEEE Journal on Selected Areas in Communications, Oct. 1991, pp. 1299-1307, vol. 9, No. 8, New York, NY.

M. Shreedhar & George Varghese, Efficient Fair Queuing Using Deficit Round-Robin, IEEE/ACM Transactions on Networking, Jun. 1996, pp. 375-385, vol. 4, No. 3.

Providing Reliable, High-Speed Operations in Large Sans, 2002 Brocade Communications Systems, Inc., Mar. 2002.

Kenneth Y. Yun, A Terabit Multiservice Switch, IEEE Micro, Jan.-Feb. 2001, pp. 58-70.

Packet Switch Chips, Feb. 2, 2003, www.lightreading.com/document.asp?doc_id=25989&print=true, Downloaded Feb. 16, 2005.

The Virtual Output Queue, http://ipoint.vlsi.uiuc.edu/abr/virtqueue.html, Downloaded Feb. 16, 2005.

Applied Micro Circuits Corporation, Cyclone (nPX8005) Switch Fabric, https://www.amcc.com/cardiff/docManagement/displayProduct Summary.jsp?prodld=nPX8005, Downloaded Feb. 16, 2005.

* cited by examiner

RULE BASED ROUTING IN A SWITCH

RELATED APPLICATION

This application is related to U.S. patent application entitled "Fibre Channel Switch," Ser. No. 10/873,532, filed on Jun. 21, 2004, now U.S. Pat. No. 7,042,842. This related application is hereby incorporated by reference.

FIELD OF THE INVENTION

The present invention relates to routing within a data communications switch. More particularly, the present invention relates to parallel, rule based frame routing in a Fibre Channel switch that routes frames to destination ports and assigns a priority used for selecting a virtual channel in an interswitch link.

BACKGROUND OF THE INVENTION

Fibre Channel is a switched communications protocol that allows concurrent communication among servers, workstations, storage devices, peripherals, and other computing devices. Fibre Channel can be considered a channel-network hybrid, containing enough network features to provide the needed connectivity, distance and protocol multiplexing, and enough channel features to retain simplicity, repeatable performance and reliable delivery. Fibre Channel is capable of full-duplex transmission of frames at rates extending from 1 Gbps (gigabits per second) to 10 Gbps. It is also able to transport commands and data according to existing protocols such as Internet protocol (IP), Small Computer System Interface (SCSI), High Performance Parallel Interface (HIPPI) and Intelligent Peripheral Interface (IPI) over both optical fiber and copper cable.

In a typical usage, Fibre Channel is used to connect one or more computers or workstations together with one or more storage devices. In the language of Fibre Channel, each of these devices is considered a node. One node can be connected directly to another, or can be interconnected such as by means of a Fibre Channel fabric. The fabric can be a single Fibre Channel switch, or a group of switches acting together. Technically, the N_port (node ports) on each node are connected to F_ports (fabric ports) on the switch. Multiple Fibre Channel switches can be combined into a single fabric. The switches connect to each other via E-Port (Expansion Port) forming an interswitch link, or ISL.

Fibre Channel data is formatted into variable length data frames. Each frame starts with a start-of-frame (SOF) indicator and ends with a cyclical redundancy check (CRC) code for error detection and an end-of-frame indicator. In between are a 24-byte header and a variable-length data payload field that can range from 0 to 2112 bytes.

The header includes a 24 bit source identifier (S_ID) that identifies the source for the frame, as well as a 24 bit destination identifier (D_ID) that identifies the desired destination for the frame. These port identifiers are uniquely assigned to every node in a Fibre Channel fabric. Under the standard Fibre Channel switch fabric addressing scheme, each port identifier is considered to contain three 8-bit words: a domain address or Domain_ID (bits 23-16 of the port ID), an area address or Area_ID (bits 15-8), and a port address or Port_ID (bits 0-7). Each switch in a Fibre Channel fabric is generally assigned a unique domain address. Groups of ports can be assigned to a single area within the switch. The addressing scheme allows 256 ports in each area, 256 areas within each switch, and 239 switches in a fabric (this is fewer than 256 switches because some switch address are reserved). The scheme allows certain routing decisions to be made by examining only a single 8-bit word. For example, a frame could be routed to the appropriate E_Port after examining only the domain address that identifies the switch on which the destination is located.

Fibre Channel switches use the D_ID found in the header of a Fibre Channel frame to route the frame from a source port to a destination port. Typically, this is accomplished using a lookup table at each input port. The D_ID is used as an index to the table, and the table returns the appropriate output port in the switch. This output port will either be directly connected to the node identified by the D_ID, or to another switch along the path to the identified destination. Routing tables are shared between multiple switches in a fabric over an ISL so that the switches can learn about the nodes and switches that make up the fabric.

Routing in modern Fibre Channel switches involves more issues than simply determining a destination port for each D_ID. This is because of the advent of virtual channels and ISL grouping. Virtual channels are used to divide up a single physical link between two ports into multiple logical or virtual channels. In most implementations, virtual channels are used to shape traffic across a port, or to provide more useful flow control across the port. One type of flow control over virtual channels is described in a separate patent application Ser. No. 10/873,330, entitled "Flow Control in a Switch" and filed on the same day as the present application. ISL grouping is the ability to establish multiple ISL connections between the same two switches. Rather than treating each path as a separate ISL, ISL groups can be created that treat the separate physical paths as single logical path. Although ISL groups simplify the administration of a fabric and allow a greater ability to load balance across multiple interswitch links, it is still necessary to provide a mechanism to select a particular ISL for each frame to be transmitted over the ISL group.

The advent of virtual channels and flow groups has made routing decisions in Fibre Channel switches more complicated. This complication means that traditional methods of routing frames have become too slow, and have become a source of undesired latency within a switch. What is needed is an improved technique for routing within a Fibre Channel switch that would avoid these problems.

SUMMARY OF THE INVENTION

The foregoing needs are met, to a great extent, by the routing module of the present invention. The routing module uses a request queue to examine each Fibre Channel frame coming into the switch. Based on this examination, the request queue forms a routing request containing the information necessary to route the frame. The routing request also includes the source port on which the Fibre Channel frame was received.

The routing request is then received by a primary router, which uses a plurality of routing rules to determine the correct initial routing for the frame. These rules are applied simultaneously to the information supplied in the routing request. Each rule independently determines whether the rule is applicable to the frame described in the routing request. Each rule also determines a routing result for the frame as if the rule were applicable. The routing result includes a switch destination address for the appropriate output port on the switch, a priority designation, and a zoning indicator. Most rules determine the routing result by using an index to look up the routing results in a routing table. The index is generally a portion of the destination address found in the frame header, but other indexes are possible. By having all of the rules function in parallel, the routing determination is accelerated. A selector is then responsible for selecting the appropriate result from these rules.

An ISL group router examines the routing result created by the primary router to determine if the chosen switch destination address is an ISL group. If so, the ISL group router determines which physical link will carry the frame, and converts the switch destination address in the routing result from the ISL group address to an address specifying a single interswitch link.

A priority combiner is able to choose between the priority designation selected by the primary router and an "in-band" priority designation. The in-band priority is a priority value that is either found within the Fibre Channel header, or can be determined by the values in the Fibre Channel header. Alternatively, the in-band priority can include a partially random value. The priority combiner can base its decision on the result returned by the primary router, thereby allowing the routing tables to determine whether in-band priority should be used or whether the priority returned by the routing table should be used. The selected priority is then used to associate the frame with a particular virtual channel during transmission across an interswitch link

DETAILED DESCRIPTION OF THE INVENTION

1. Switch 100

Figure 1:
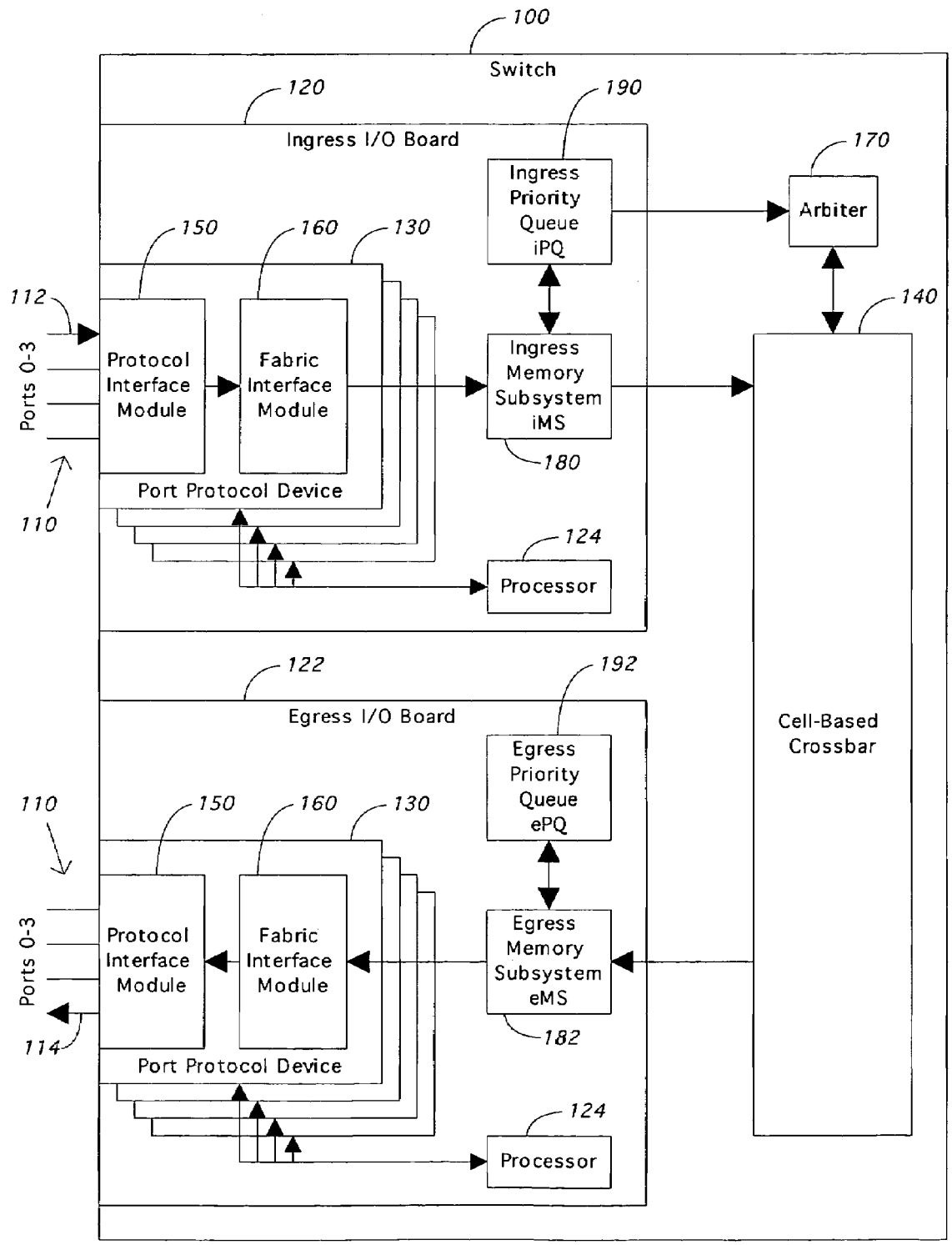
FIG. 1 is a block diagram of one possible Fibre Channel switch in which the present invention can be utilized.

The present invention is best understood after examining the major components of a Fibre Channel switch, such as switch 100 shown in FIG. 1. The components of switch 100 are helpful in understanding the applicant's preferred embodiment, but persons of ordinary skill will understand that the present invention can be incorporated in switches of different construction, configuration, or port counts.

Switch 100 is a director class Fibre Channel switch having a plurality of Fibre Channel ports 110. The ports 110 are physically located on one or more I/O boards inside of switch 100. Although FIG. 1 shows only two I/O boards, namely ingress board 120 and egress board 122, a director class switch 100 would contain eight or more such boards. The preferred embodiment described in the application can contain thirty-two such I/O boards 120, 122. Each board 120, 122 contains a microprocessor 124 that, along with its RAM and flash memory (not shown), is responsible for controlling and monitoring the other components on the boards 120, 122 and for handling communication between the boards 120, 122.

In the preferred embodiment, each board 120, 122 also contains four port protocol devices (or PPDs) 130. These PPDs 130 can take a variety of known forms, including an ASIC, an FPGA, a daughter card, or even a plurality of chips found directly on the boards 120, 122. In the preferred embodiment, the PPDs 130 are ASICs, and can be referred to as the FCP ASICs, since they are primarily designed to handle Fibre Channel protocol data. Each PPD 130 manages and controls four ports 110. This means that each I/O board 120, 122 in the preferred embodiment contains sixteen Fibre Channel ports 110.

The I/O boards 120, 122 are connected to one or more crossbars 140 designed to establish a switched communication path between two ports 110. Although only a single crossbar 140 is shown, the preferred embodiment uses four or more crossbar devices 140 working together. Of particular importance is the fact that crossbar 140 is cell-based, meaning that it is designed to switch small, fixed-size cells of data. This is true even though the overall switch 100 is designed to switch variable length Fibre Channel frames.

The Fibre Channel frames are received on a port, such as input port 112, and are processed by the port protocol device 130 connected to that port 112. The PPD 130 contains two major logical sections, namely a protocol interface module 150 and a fabric interface module 160. The protocol interface module 150 receives Fibre Channel frames from the ports 110 and stores them in temporary buffer memory. The protocol interface module 150 also examines the frame header for its destination ID and determines the appropriate output or egress port 114 for that frame. The frames are then submitted to the fabric interface module 160, which segments the variable-length Fibre Channel frames into fixed-length cells acceptable to crossbar 140.

The fabric interface module 160 then transmits the cells to an ingress memory subsystem (iMS) 180. A single iMS 180 handles all frames received on the I/O board 120, regardless of the port 110 or PPD 130 on which the frame was received.

When the ingress memory subsystem 180 receives the cells that make up a particular Fibre Channel frame, it treats that collection of cells as a variable length packet. The iMS 180 assigns this packet a packet ID (or "PID") that indicates the cell buffer address in the iMS 180 where the packet is stored. The PID and the packet length is then passed on to the ingress Priority Queue (iPQ) 190, which organizes the packets in iMS 180 into one or more queues, and submits those packets to crossbar 140. Before submitting a packet to crossbar 140, the iPQ 190 submits a "bid" to arbiter 170. When the arbiter 170 receives the bid, it configures the appropriate connection through crossbar 140, and then grants access to that connection to the iPQ 190. The packet length is used to ensure that the connection is maintained until the entire packet has been transmitted through the crossbar 140.

A single arbiter 170 can manage four different crossbars 140. The arbiter 170 handles multiple simultaneous bids from all iPQs 190 in the switch 100, and can grant multiple simultaneous connections through crossbar 140. The arbiter 170 also handles conflicting bids, ensuring that no output port 114 receives data from more than one input port 112 at a time.

The output or egress memory subsystem (eMS) 182 receives the data cells comprising the packet from the crossbar 140, and passes a packet ID to an egress priority queue (ePQ) 192. The egress priority queue 192 provides scheduling, traffic management, and queuing for communication between egress memory subsystem 182 and the PPD 130 in egress I/O board 122. When directed to do so by the ePQ 192, the eMS 182 transmits the cells comprising the Fibre Channel frame to the egress portion of PPD 130. The fabric interface module 160 then reassembles the data cells and presents the resulting Fibre Channel frame to the protocol interface module 150. The protocol interface module 150 stores the frame in its buffer, and then outputs the frame through output port 114.

In the preferred embodiment, crossbar 140 and the related components are part of a commercially available cell-based switch chipset, such as the nPX8005 or "Cyclone" switch fabric manufactured by Applied Micro Circuits Corporation of San Diego, Calif. More particularly, in the preferred embodiment, the crossbar 140 is the AMCC S8705 Crossbar product, the arbiter 170 is the AMCC S8605 Arbiter, the iPQ 190 and ePQ 192 are AMCC S8505 Priority Queues, and the iMS 180 and eMS 182 are AMCC S8905 Memory Subsystems, all manufactured by Applied Micro Circuits Corporation

2. Port Protocol Device

Figure 2:
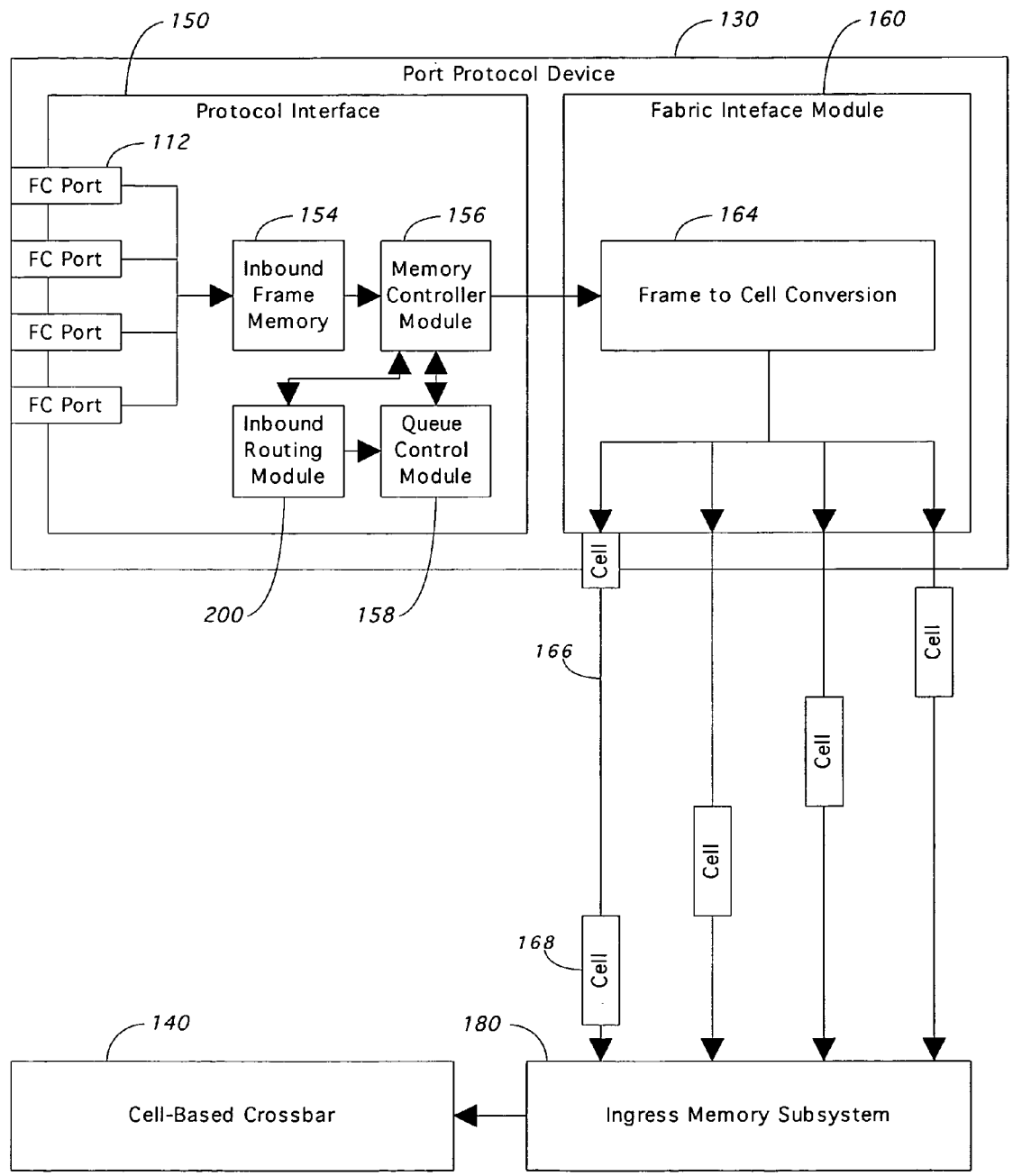
FIG. 2 is a block diagram showing the details of the input port protocol device of the Fibre Channel switch shown in FIG. 1.

FIG. 2 shows the ingress port protocol device 130 in more detail. As explained above, incoming Fibre Channel frames are received over the ingress port 112 by the protocol interface 150. The incoming frames are stored on an incoming inbound frame buffer memory 154, with each port 110 being allocated either a separate buffer154 or a separate portion of the buffer 154. This buffer 154 is also known as the credit memory, since the BB_Credit flow control between switch 100 and the upstream device is based upon the size or credits of this memory 154. A separate memory controller module (MCM) 156 for each port identifies new Fibre Channel frames arriving in credit memory 154, and shares the frame's destination ID and its location in buffer memory 154 with the inbound routing module 200 and the queue control module 158. The memory controller module 156 is also responsible for reading the data frames out of memory 154 and providing the frame to the fabric interface module 160. The routing module 200 of the present invention examines the destination ID found in the frame header of the frames and determines the switch destination address in switch 100 for the selected destination port 114 of the frame. A single routing module 200 handles all of the routing for the PPD 130. This process is described in greater detail below.

The queue control module 158 maintains data queues that ensure the in-order delivery of received Fibre Channel frames through switch 100. The queue module 158 is also responsible for implementing procedures to avoid head-of-line blocking. In the preferred embodiment, the queue control module 158 accomplishes these objectives by implementing the deferred queuing technique described in the incorporated Fibre Channel Switch application. A separate queue control module 158 is used for each port 110, and in the preferred embodiment is included as part of a memory controller module that controls each buffer memory 154.

When a Fibre Channel frame is ready to be submitted to the memory subsystem 180 of the ingress I/O board 120, the memory controller 156 takes the frame from the credit memory 154 of the protocol interface 150 and provides it to the fabric interface module 160. The conversion component 164 of the fabric interface module 160 converts the variable-length Fibre Channel frames received from the protocol interface into fixed-sized data cells 168 acceptable to the cell-based crossbar 140. Each cell 168 is constructed with a cell header identifying the destination port 114, as identified by routing module 200. The fabric interface module 160 then transmits the data cells 168 to the ingress memory subsystem 180 through a plurality of serial data paths 166, four of which are shown in FIG. 2. The cells 168 are placed sequentially on each of the paths 166 in a round robin matter. FIG. 2 illustrates this round robin nature by placing a gap on each path 166 when other paths 166 contain a data cell 168. In actuality, no significant gap exists between the end of one cell 168 and the beginning of the next cell 168 on a single path 166. If no data is ready to be sent to the iMS 180 when it is time to place a new cell 168 on a path 166, an empty data cell 168 is sent.

3. Fabric 101

Figure 3:
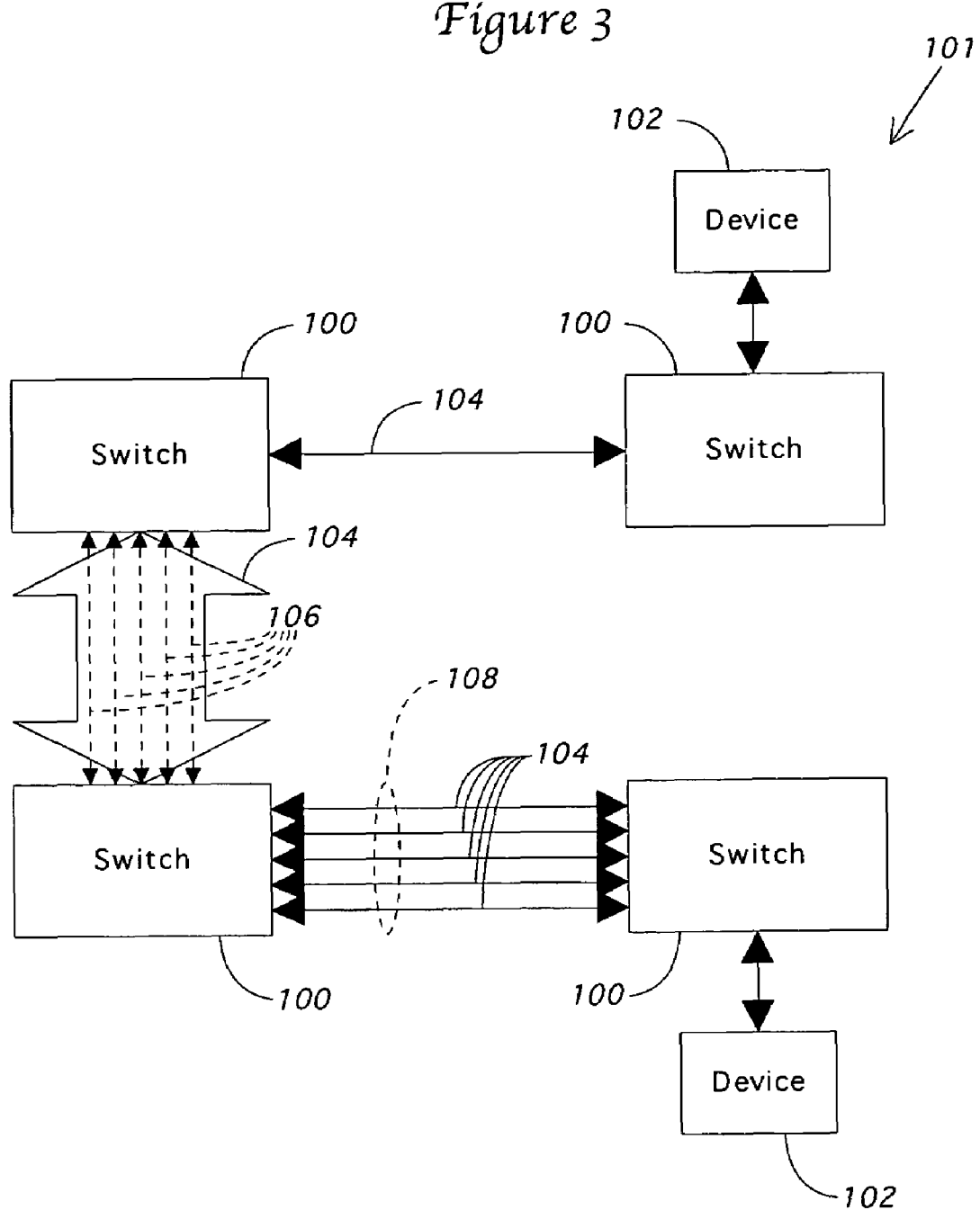
FIG. 3 is a block diagram of a Fibre Channel fabric in which the present invention can be utilized.

FIG. 3 shows two devices 102 connected together over a fabric 101 consisting of four switches 100. Each of these switches 100 is connected together using one or more inter-switch links 104. Switch 100*a* connects to switch 100*b* through a single ISL 104. Likewise, the connection between switch 100*b* and switch 100*c* uses a single ISL 104 as well. This ISL 104, however, is subdivided into a plurality of logical or virtual channels 106. The channels 106 can be used to shape traffic flow over the ISL 104. In the preferred embodiment, the virtual channels 106 are also used to enhance the flow control over the interswitch link 104. The present invention routing system allows for the convenient assignment of data traffic to a particular virtual channel 106 based upon the source and destination of the traffic. For instance, traffic between the two devices 102 can be assigned to a different virtual channel 106 than all other traffic between the two switches 100*b*, 100*c*. Congestion on the other virtual channels 106 in the ISL 104 would not then affect the traffic between the two devices 102, even though all traffic shares the same physical link 104.

Switch 100*c* and switch 100*d* are interconnected using five different interswitch links 104. It can be extremely useful to group these different ISL links 104 into a single ISL group 108. The ISL group 108 can then appear as a single large bandwidth link between the two switches 100*c* and 100*b* during the configuration and maintenance of the fabric 101. In addition, defining an ISL group 108 allows the switches 100*c* and 100*d* to more effectively balance the traffic load across the physical interswitch links 104 that make up the ISL group 108.

4. Inbound Routing Module 200

Figure 4:
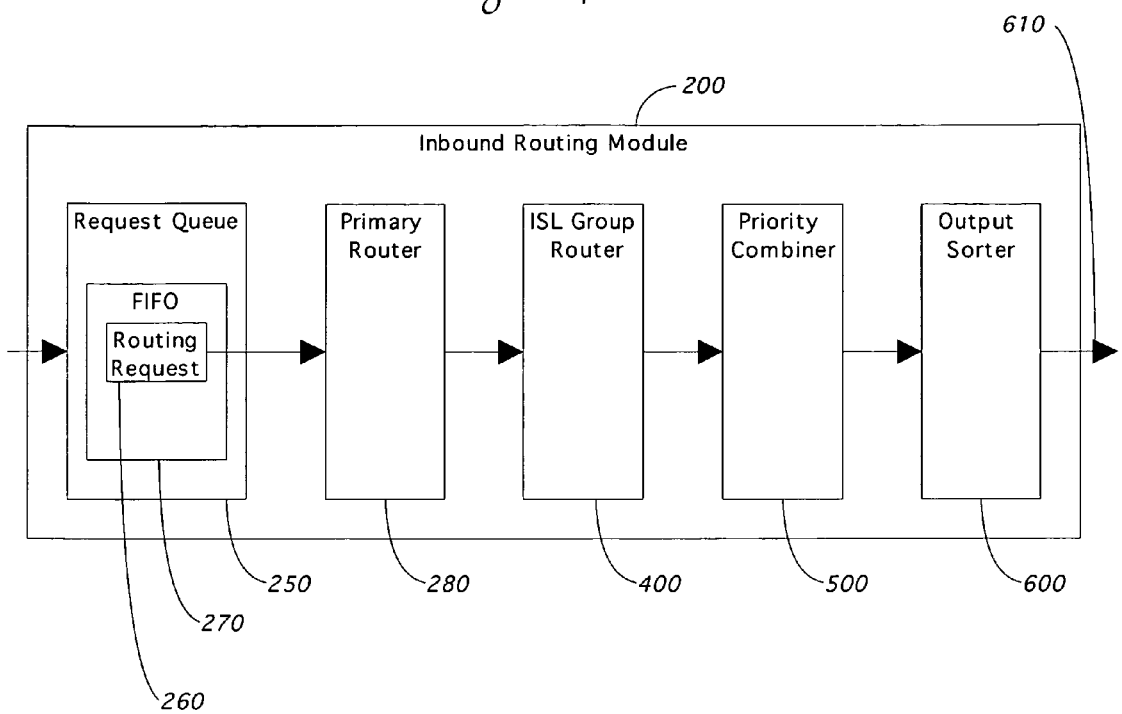
FIG. 4 is a block diagram showing the details of the inbound routing module of the input port protocol device shown in FIG. 2.

FIG. 4 shows the primary components of the inbound routing module (IRM) 200 of the present invention. The request queue 250 examines each Fibre Channel frame header received from the Memory Controller Module 156 and forms a routing request, which contains the information required for routing the frame including the source port 112 and the D_ID for the frame. The request queue 250 also arbitrates routing requests from the four ports 110 associated with the PPD 130.

The primary router 280 uses the source port 112 and the D_ID found in the routing request to determine the appropriate switch destination address for that D_ID. This determination takes into account a variety of zoning rules. The primary router 280 also determines an out-of-band priority designation that is used in the preferred embodiment to associate the frame with a virtual channel 106 across the output port 114.

The ISL group router 400 examines the routing result created by the primary router 280 to determine if the chosen destination port is an ISL group 108. If so, the ISL group router 400 determines which of the links 104 in the ISL group 108 will carry the frame to the other switch 100. It then converts the destination port identifying the ISL group 108 received from primary router 280 to a switch destination address identifying an E_Port for a single ISL 104 within the group 108.

The priority combiner 500 examines an in-band priority designation and an out-of-band priority designation made by the primary router 280, and assigns the actual priority level for the routing decision.

The output sorter 600 uses the source port found in the routing result and delivers each routing result to the correct MCM 156. The output from this component 600 serves as the output of the entire IRM 200. The MCM 156 then stores the routing results in its queues as maintained by queue control module 158. When the MCM 156 reads each frame from credit memory 154, the MCM 156 modifies the frame's header and inserts the frame's source part, destination port, priority, and routing reason code. The fabric interface module 160 uses this information to segment the frames into cells 168 that can be switched across the crossbar 140.

5. Addressing a) Ports & Regions

The S_ID and D_ID are designated using standard, 24 bit Fibre Channel switch fabric addressing. These addresses are assigned using two different addressing modes: auto discovery addressing and fixed addressing. In auto discovery mode, new devices added to Fibre Channel loop automatically negotiate for the first available port address or Port_ID. In fixed addressing, the administrator for a device selects a port address for the device. In either mode, all devices on a single loop share a Domain_ID and an Area_ID. Although the Fibre Channel specifications describe both types of addressing, all known applications use auto discovery addressing.

Figure 5:
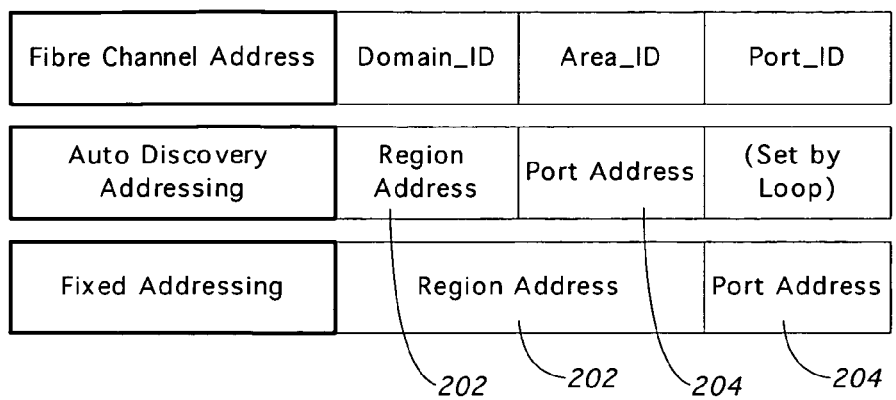
FIG. 5 is a block diagram illustrating the addressing scheme used in connection with auto discovery addressing and fixed addressing.

The present invention treats these two different addressing schemes differently, as shown in FIG. 5. In auto discovery addressing, the Port_ID is not fixed and therefore all routing is done to the loop as a whole. The present invention treats the Domain_ID as a "region" address 202, and treats the Area_ID as the "port" address 204. Since the loop protocol handles its own routing, the IRM 200 ignores the Port_ID for auto discovery addressing. If fixed addressing is used, the true Port_ID (bits 7-0 of the Fibre Channel address) is considered the port address, with the Domain_ID and the Area ID being considered the region address. A region is a set of 256 port addresses that share a region address. A region corresponds roughly to a Fibre Channel domain.

The two addressing modes may be mixed in a single switch 100. For example, the fabric 101 may primarily use auto discovery addressing, but the user may desire to view a loop or a virtual adapter as a fixed addressing region so that the destination devices in the loop or virtual adapter can be independently prioritized and/or zoned based on their Port_ID.

b) Lumped Region View and Split Region View

The inbound routing module 200 has two ways of viewing regions, the lumped region view and the split region view. In the lumped region view, the IRM 200 sees the region as a single entity. When making routing and zoning decisions, the switch 100 considers only the region address202, and not the port address 204. In the split region view, the IRM 200 sees the individual ports within the region. When making routing and zoning decisions in the split region view, the switch 100 considers both the region address 202 and port address204. The split region view is required for regions that are served by switch 100, and for regions served by other switches that require routing or hard zoning based on port address. For other regions, the lumped region view is generally sufficient.

For fabrics that use auto discovery addressing, the IRM 200 supports all of the legal 239 regions (there are 239 valid Domain IDs). For 32 of the 239 regions, the IRM can use the split region view, viewing the ports within those regions individually for purposes of routing, prioritization, and hard zoning. For the other regions, the IRM uses the lumped region view. For fabrics that use fixed addressing (no known fabrics fall into this category), the IRM supports only 32 regions, and all of the regions use the split region view.

c) Switch Destination Address

IRM 200 determines the frame's physical destination, which may be one of 512 Fibre Channel ports 110 or one of microprocessors 124 found on the I/O boards 120, 122. The IRM 200 also recognizes intermediate logical destinations relating to internal multicasts groups (eight per I/O board 120, 122) or one of eight ISL groups 108. These intermediate logical destinations are later mapped to the switch destination address of a physical destination.

Figure 6:
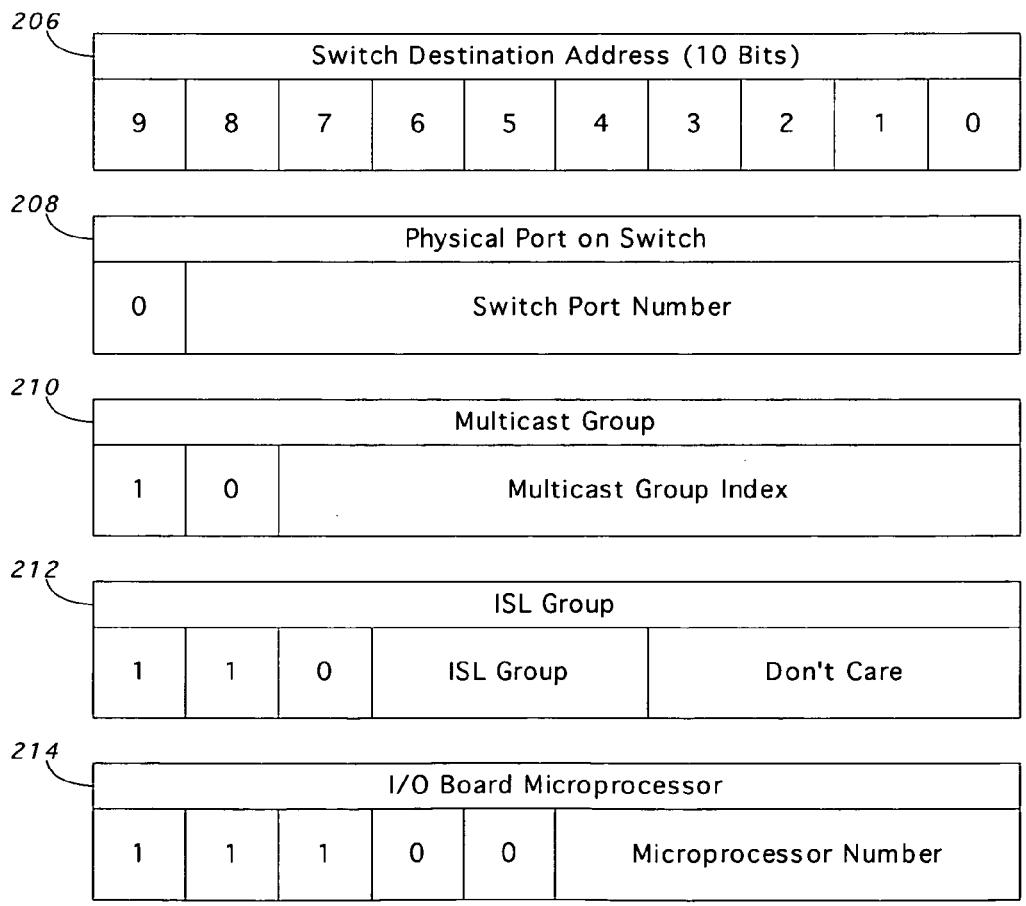
FIG. 6 is a block diagram illustrating the switch destination addresses used in one embodiment of the present invention.

As shown in FIG. 6 the present invention uses a ten bit address to define the switch destination address 206, which can address physical ports 110, multicast groups, ISL groups 108, and microprocessor directed communication. The switch destination address 206 is the address used by the switch 100 for internal routing. Addresses 208 for actual physical ports always have a 0 in the most significant bit. Multicast group addresses 210 start "10" in their most significant bits, while ISL group addresses 212 start "110," and microprocessor addresses 214 start "11100."

Each of the address formats in FIG. 6 can be easily changed to accommodate different numbers of physical ports 110, multicast groups, ISL groups, or microprocessors 124. For instance, the switch destination addresses 206 could have more than ten bits, which would allow physical port address 208 to have a larger address range. In addition, even though the ISL group addresses 212 in FIG. 6 show only three bits being used to select an ISL group, all six available bits could be used. This would allow a total of one hundred twenty-eight different ISL group addresses 212 even without expanding the size of the switch destination addresses 206.

6. Request Queue 250

Referring back to FIG. 4, the memory control module 156 provides the request queue 250 with header information and a buffer memory location for each new frame that enters memory 154. The preferred embodiment presents this information through eight separate inputs, one memory location input and one header input for each of the four ports 110 associated with PPD 130. An arbiter within request queue 250 is able to arbitrate routing requests from the four ports 110. The primary purpose of the request queue 250 is to examine the received frame header and extract a routing request 260 for each frame. In the preferred embodiment, the routing request 260 is fifty-two bits in length and contains the information shown in Table 1.

TABLE 1

| Length (in bits) | Information | Source |
|---|---|---|
| 2 | Source Port Number | MCM 156 |
| 4 | SOF Type | Frame Header |
| 24 | D_ID | Frame Header |
| 8 | Frame's Type Field | Frame Header |
| 1 | Type Field Valid Indicator | Frame Header |
| 3 | In-Band Priority | Derived from the Frame Header |

TABLE 1-continued

| Length (in bits) | Information | Source |
|---|---|---|
| 9 | Credit Memory Location | MCM 156 |
| 1 | CRC Regeneration | MCM 156 (set when change made to frame header) |
| 2 | Source Port Number | MCM 156 |

The request queue 250 writes the requests 260, one at a time, into a buffer or FIFO 270. In the preferred embodiment, the request FIFO 270 is big enough to hold four hundred routing requests 260, one hundred for each port 110.

When it is necessary to configure the primary router 280 and ISL group router 400, a command is sent to the request queue 250 to stop sending routing requests from the FIFO 270 to the primary router 280. Routing requests 260 accumulate in the FIFO 270 until the primary router 280 and ISL group router 400 are configured. While the request FIFO 270 holds routing requests 260, frames accumulate in the credit memory 154. When the configuration is complete, the requests 260 in the FIFO 270 are again made available to the primary router 280. The request FIFO 270 may also need to be stopped when the processor 124 reads the contents of the routing tables of primary router 280, at least in cases where the routing tables are implemented using single ported memory.

The request queue 250 also has the ability to purge stale routing requests 260 for a port 110 from the FIFO 270. In the preferred embodiment, this is accomplished by setting a bit in a register. When this purge enable bit is set, the request queue 250 will create a special purge routing request and add it to the request FIFO 270. This purge request 260 contains the two bit source port number, a unique, unused SOF type ("1110"), and port purge compare value (the four least significant bits of the D_ID). All other bits in the purge request are set to zero. The IRM 200 will discard all routing requests for the designated port 110 while the purge enable bit is set until the purge routing request that matches the purge compare value is read out of the request queue FIFO 270. At this point, the IRM 200 will discard the purge routing request and set the purge enable bit to zero. Routing requests 260 will resume being sent to the primary router 280.

Each time the purge compare value is changed, a new "purge routing request" will be written into the FIFO 270. One possibility for this is if a link reset occurs multiple times while the IRM 200 is still disabled. While the IRM 200 is disabled, the processor 124 may change the purge compare value while the purge enable bit is set, but may only do so up to the value "1111". This will ensure that the FIFO 270 will not overflow and that the IRM 200 will not stop purging on the incorrect "purge routing request".

7. Primary Router 280

Figure 7:
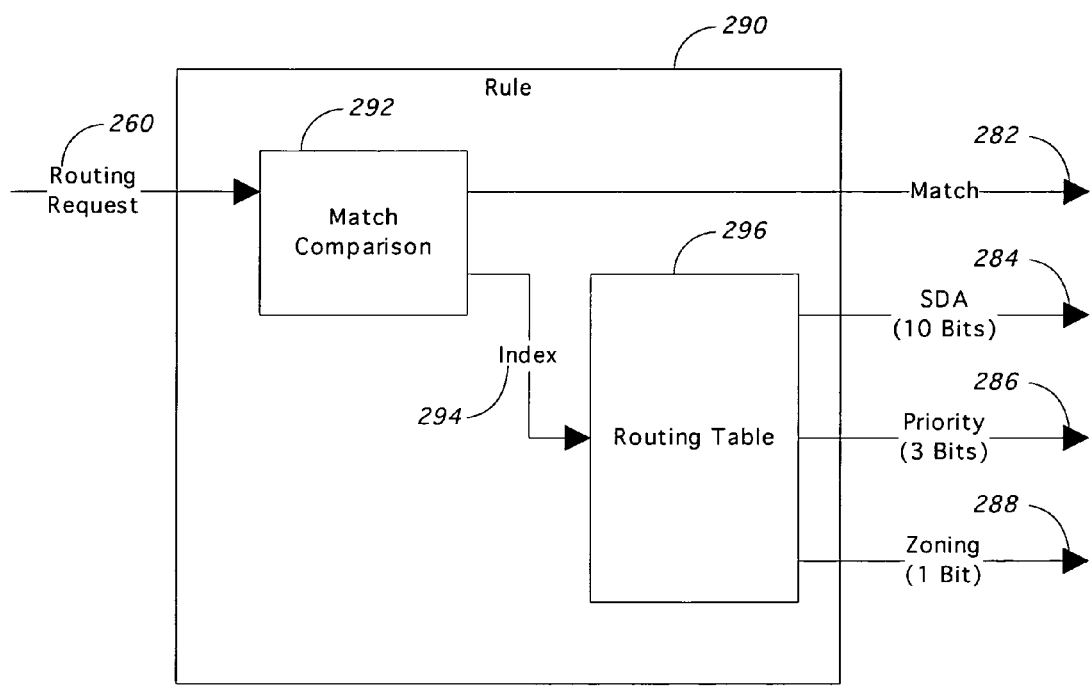
FIG. 7 is a block diagram of a typical rule used in a primary router found in the inbound routing module shown in FIG. 4.

As shown generally in FIG. 7, the primary router 280 receives routing requests 260 and then uses a plurality of routing rules 290 to determine the correct routing for the frame. The primary router 280 functions by simultaneously applying different routing rules 290 to the routing request 260. In most of the rules 290, a match comparison component 292 examines the routing request 260 to see if the D_ID within the request 260 matches the addresses that are relevant to the rule 290. In most cases, the match comparison component 292 also determines an index 294 that is used to look up routing results for the request 260 in a routing table 296. Each rule 290 produces for its result a match indicator 282 that tells whether the rule 290 is applicable to the routing request 260, as well as a switch destination address 284, an out-of-band priority designation 286, and a zoning indicator 288. All of the rules 290 function in parallel, so as to speed up the routing determination. A selector 380 (shown in FIG. 8) is then responsible for selecting the appropriate result from these rules 290.

In the preferred embodiment, the priority for a routed frame is used to associate the frame with one of eight virtual channels 106 across a switch port 110. The priority fields are therefore only three bits long. Generally speaking, in-band priority is a priority based upon the content of the Fibre Channel frame, while out-of-band priority is based upon a routing determination using routing tables in the primary router 280. In one instance, the in-band priority is taken from three bits within the Fibre Channel header, such as the bit 17 from the F_CTL (or frame control field) and bits 30-31 in the CS_CTL (or class specific control field). Alternatively, the in-band priority can be partially randomized. One way to do so is to based the in-band priority on the least significant bits of the assigned switch destination address 206. For instance, if either bit 17 from F_CTL or bit 31 of CS_CTL were set to zero, the in-band priority could be 0 plus the two least significant bits of the switch destination address 206. If both bit 17 from F_CTL and bit 31 of CS_CTL were set to one, the in-band priority would be 1 plus the two least significant bits of the switch destination address 206.

Some of the routing tables used by the rules 320-370 will contain an out-of-band priority enable bit. This bit indicates whether the inbound routing module 200 is to assign out-of-band priority or in-band priority to the routed frames. If the out-of-band priority enable bit is zero, the frame will be assigned in-band priority, otherwise the frame will use out-of-band priority. The priority will be assigned to a known level (i.e., six or seven) for any frame that is sent to the violation switch destination address.

The routing tables may also include a zoning indicator that confirms that the source port is allowed to communicate with the destination port according to the current zoning rules. The zoning indicator uses a single bit to establish permission for a source to communicate with a destination, with the bit being set to one to indicate permission. In some routing tables, multiple zoning bits are associated with a single source-destination pair, with each bit being associated with a different Fibre Channel frame type (such as SCSI-3 or FICON).

The routing tables may also contain a destination enable bit to indicate whether a particular destination is present and able to accept frames. If this bit is zero, the destination is not present or cannot accept frames. When combined with the zoning indicator, this allows the present invention to distinguish between zoning errors (the destination is present, but the source is not zoned to communicate with the destination) and destination not present errors. In both cases, the primary router 280 sends frames with these errors to the violation destination along with an error code indicating the source of the error. Frames received that are shorter than the Fibre Channel definition of nine words are automatically routed to the violation register with a reason code of "short frame received".

Figure 8:
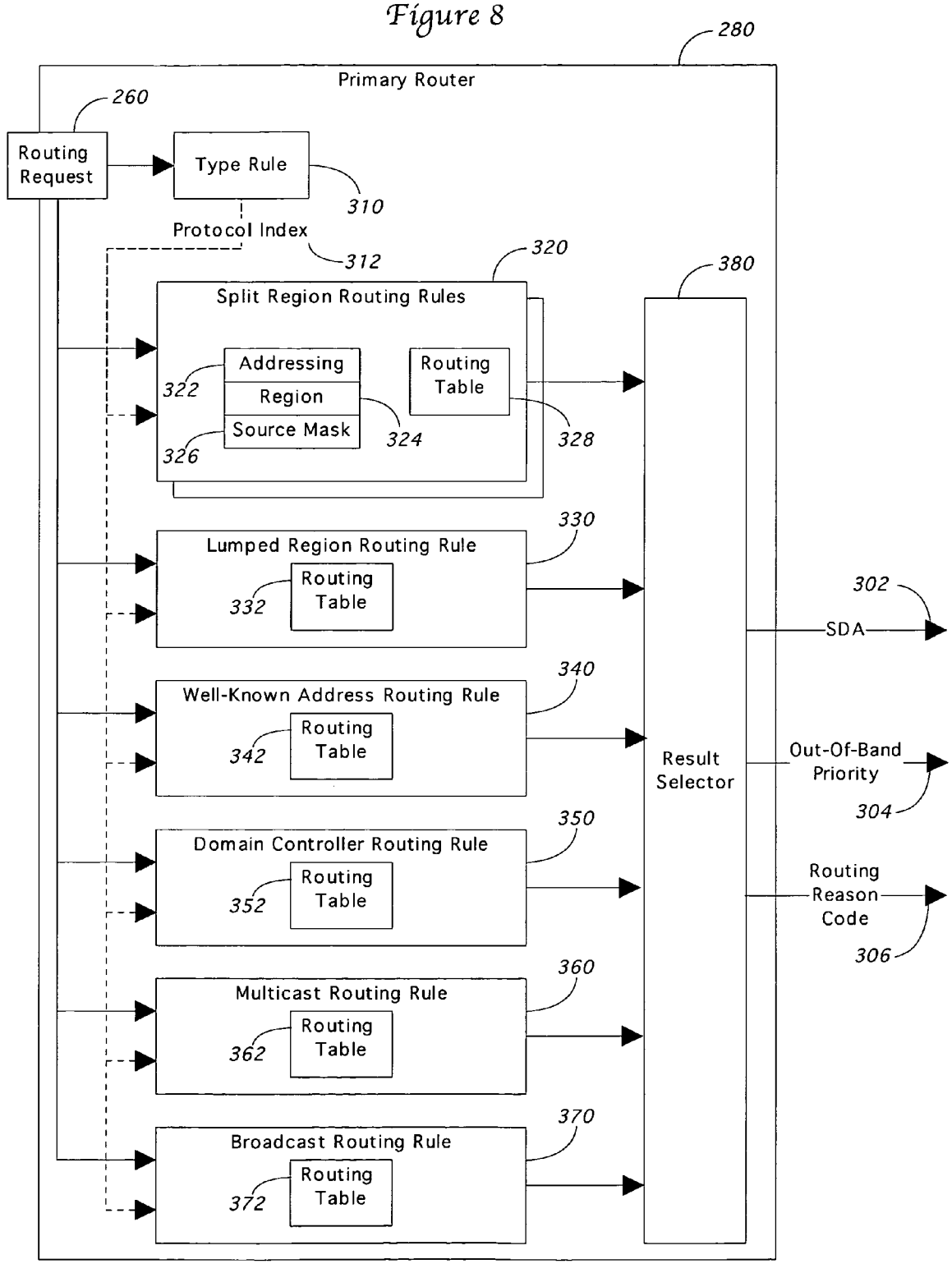
FIG. 8 is a block diagram of the primary router found in the inbound routing module shown in FIG. 4.

The primary components of the primary router 280 are shown in FIG. 8. These components are described in detail below.

a) Type Rule 310

The type rule 310 does not route routing requests 260. Rather, this rule 310 transforms the type field found in the routing request 260 into a format that the primary router 280 can use. Although the routing request's eight-bit type field has 256 possible values, the primary router 280 only supports eight logical protocols. The type rule 310 converts the routing request's eight-bit type field and one-bit type field valid indicator into a three-bit protocol index 312. If the type field valid indicator shows that the type field in the routing request 260 is not valid, the type rule sets the protocol index 312 to seven. Otherwise, the type rule 310 examines the type field from the routing request 260, and assigns one of six programmable types to this Fibre Channel frame by setting the protocol index 312 to a number between zero and five. If the type field matches multiple programmable values, the type rule chooses the lowest matching protocol index 312. A protocol index value of six indicates that the type field of the routing request 260 did not match any of the six programmable types. The protocol index 312 is then used by the other rules 320-370 to make protocol-based routing and zoning decisions.

b) Split Region Routing Rules 320

As explained above, the term split region means that the IRM 200 bases its routing on the port address 204 found in the D_ID. This is in contrast to the lumped region view of the D_ID, which routes according to the region address 202 only. Of the possible 239 regions, a maximum of thirty-two are routed according to the split region routing rules 320. Each region is handled by a different rule 320 meaning that there are a total of thirty-two split region routing rules 320.

As shown in FIG. 8, each split region routing rule 320 identifies routing requests for its region using a register specially configured for that rule. This register has an addressing mode 322, region identifier 324, and source port mask 326. The addressing mode 322 is a single bit that communicates whether auto discovery addressing or fixed addressing is being used in the rule's region. The region identifier 324 specifies the region that is applicable to the rule 320. The identifier is sixteen bits long, but only the most significant eight bits are used in auto discovery addressing. Together, the region identifier 324 and the address mode identifier 322 can determine whether the region address 202 in the routing request 260 matches the region for that rule 320. The address mode identifier 322 is also used to identify the port address 204 for that D_ID.

The source port mask 326 indicates if the source port 112 is allowed to use this split region routing rule 320. The mask 326 is four bits long, one bit for each port in the PPD 130. Setting the correct bit in this mask 326 allows the processor 124 to disable the use of this rule 320 with the ports 110 on the PPD 130. If the source port mask 326 indicates that the rule 320 is disabled for the source port 112 indicated in the routing request 260, the primary router 280 will attempt to match the routing requests 260 to some other rule.

When a rule 320 determines that a routing request 260 belongs to its region and the source port 112 is allowed to use this rule 320, the rule 320 uses the port address 204 of the D_ID as an index to a region routing table 328. Each rule 320 contains its own routing table 328, meaning that the routing table 328 applies only to a single region address 202. The routing table 328 is configurable by the processor 124, and contains two hundred fifty-six entries. Each entry in the routing table contains the switch destination address 206 (with all ports 110 in the PPD 130 using the same switch destination address 206), and four separate entries (one for each port on the PPD 130) of the following fields: a three-bit priority field, a one-bit destination enable bit, a one-bit out-of-band priority enable bit, and an eight-bit zoning field. As explained above, the priority field specifies the out-of-band priority for this combination of source port 112 and D_ID, the destination enable bit determines whether this destination is enabled for this source port 112, the out-of-band priority bit chooses between in-band or out-of-band priority, and the zoning field indicates whether the zoning rules allow this source port 112 to communicate to this D_ID for the frame type.

c) Lumped Region Routing Rule 330

The lumped region routing rule 330 routes requests for frames that are intended to flow from a source port 112 to destination port 114 using the lumped region view. Since all port addresses 204 within a region are routed identically, there is no need for a separate routing table for each region address 202. Rather, the lumped region routing rule 330 uses a single routing table 332 for all regions, with the region address 202 acting as the index to the table 332. Much like the thirty-two split region routing tables 328, each entry in the lumped region routing table 332 contains one switch destination address 206, and four priority, destination enable, and zoning fields (one for each port 110 on the PPD 130). In the preferred embodiment, the lumped region routing table 332 contains only 256 entries, meaning that the lumped region routing rule 330 supports only 256 different regions. Consequently, the rule 330 in this form is useful only for auto discovery addressing mode since only 256 different region addresses 202 exist in this mode. To support fixed addressing mode, which uses a sixteen-bit region address 202, the lumped region routing table would need to have over thirty-two thousand entries.

d) Well-Known Address Routing Rule 340

The well-known address routing rule 340 identifies and routes routing requests for frames that are intended to flow from source port 112 to a well-known address destinations as defined by the Fibre Channel protocol. The single well-known address routing rule 340 handles frames destined for all fifteen well-known addresses in the range 0×FFFFF0 through 0×FFFFFE.

The well-known address routing rule identifies routing requests for frames destined for well-known addresses by comparing bits 4-23 in each routing request's D_ID to 0×FFFFF. The result selector 380 gives preference to the broadcast routing rule 370 over the well-known address routing rule 340, ensuring that the well-known address routing rule's routing result is ignored when the routing request's D_ID is 0×FFFFFF (indicating broadcast).

When the rule 340 determines that a routing request is destined for a well-known address, it uses the four least significant bits in the routing request's D_ID as an index to a processor-configurable, fifteen-entry, well known address routing table 342. This table contains the switch destination address 206, destination enable bits, and the zoning indicators for each well-known address. This routing table 342 does not contain priority 10 fields, as the well-known address routing rule 340 assigns all frames to fixed out-of-band priority level, such as priority level six or seven.

e) Domain Controller Routing Rule 350

The domain controller routing rule 350 identifies and routes routing requests for frames that are intended to flow from a source port 112 to a domain controller destination. A single domain controller routing rule 350 handles routing requests for frames destined for all 256 domain controller addresses in the range 0×FFFC00 through 0×FFFCFF. The domain controller routing rule 350 identifies frames destined for domain controllers by comparing bits 8-23 of each routing request's D_ID to 0×FFFC. When the rule 350 determines that a routing request 260 is destined for a domain controller address, it uses bits 0-7 of the routing request's D_ID as an index to a processor-configurable, two hundred fifty-six entry domain controller routing table 352, which contains the switch destination address and zoning indicator for that domain controller. Much like the well-known address routing rule 340, the domain controller routing table 352 does not contain priority information, since the domain controller routing rule 350 assigns all frames to a single, predetermined out-of-band priority level such as six or seven.

J) Multicast Routing Rule 360

The multicast routing rule 360 identifies and routes routing requests for frames that are intended to flow from a source port 112 to multiple destination ports 114. A single multicast routing rule 360 handles routing requests 260 for frames destined for all 256 multicast group addresses in the range 0xFFFB00 through 0xFFFBFF. The multicast routing rule 360 identifies routing requests for frames destined for Fibre Channel multicast groups by comparing bits 8-23 of the frame's D_ID to 0xFFFB. When the rule 360 determines that a routing request 260 is destined for a Fibre Channel multicast group address, it uses bits 0-7 of the routing request's D_ID as an index to a processor-configurable, two hundred fifty-six entry multicast group routing table 362. This table 362 contains the switch destination address and zoning indicator for that Fibre Channel multicast group. Once again, this rule 360 sets the out-of-band priority to a fixed level.

In the preferred embodiment, the switch destination addresses in the multicast group routing table are multicast switch destination addresses 210. Each of the 256 multicast switch destination addresses 210 identifies one of 256 internal logical multicast groups. For each logical multicast group, the IRM 200, MCM 156, and FIM 160 cooperate to send frames for that group to a subset of the microprocessors 124 that control the I/O boards 120, 122. Those microprocessors 124 replicate the frames to the Fibre Channel ports 110 on their I/O boards 120, 122.

g) Broadcast Routing Rule 370

Like the multicast routing rule 360, the broadcast routing rule 370 identifies and routes routing requests 260 for frames that are intended to flow from a source port 112 to multiple Fibre Channel destination ports 114. The broadcast routing rule handles frames with D_ID=0xFFFFFF. The broadcast routing rule is unique because the switch destination address 206 assigned to broadcast frames depends on the routing request's protocol index 312, not just the on the D_ID in the routing request 260.

The broadcast routing rule 370 identifies routing requests 260 for broadcast frames by comparing the routing request's D_ID to 0xFFFFFF. When the rule 370 determines that a routing request 260 belongs to a broadcast frame, it uses the routing request's protocol index 312 as an index to a processor-configurable, eight-entry broadcast routing table 372, which contains the broadcast switch destination address 206 and zoning for that protocol index 312. In the preferred embodiment, the switch destination addresses in the broadcast routing table 372 are multicast switch destination addresses 210. The PPD 130 uses its multicast mechanism to replicate broadcast frames. The broadcast routing rule 370 assigns all frames to set out-of-band priority level. Preferably, the well-known address routing rule 340, the domain controller routing rule 350, the multicast routing rule 360, and the broadcast routing rule 370 all assign their frames to the same priority level.

h) Result Selector 380

Figure 9:
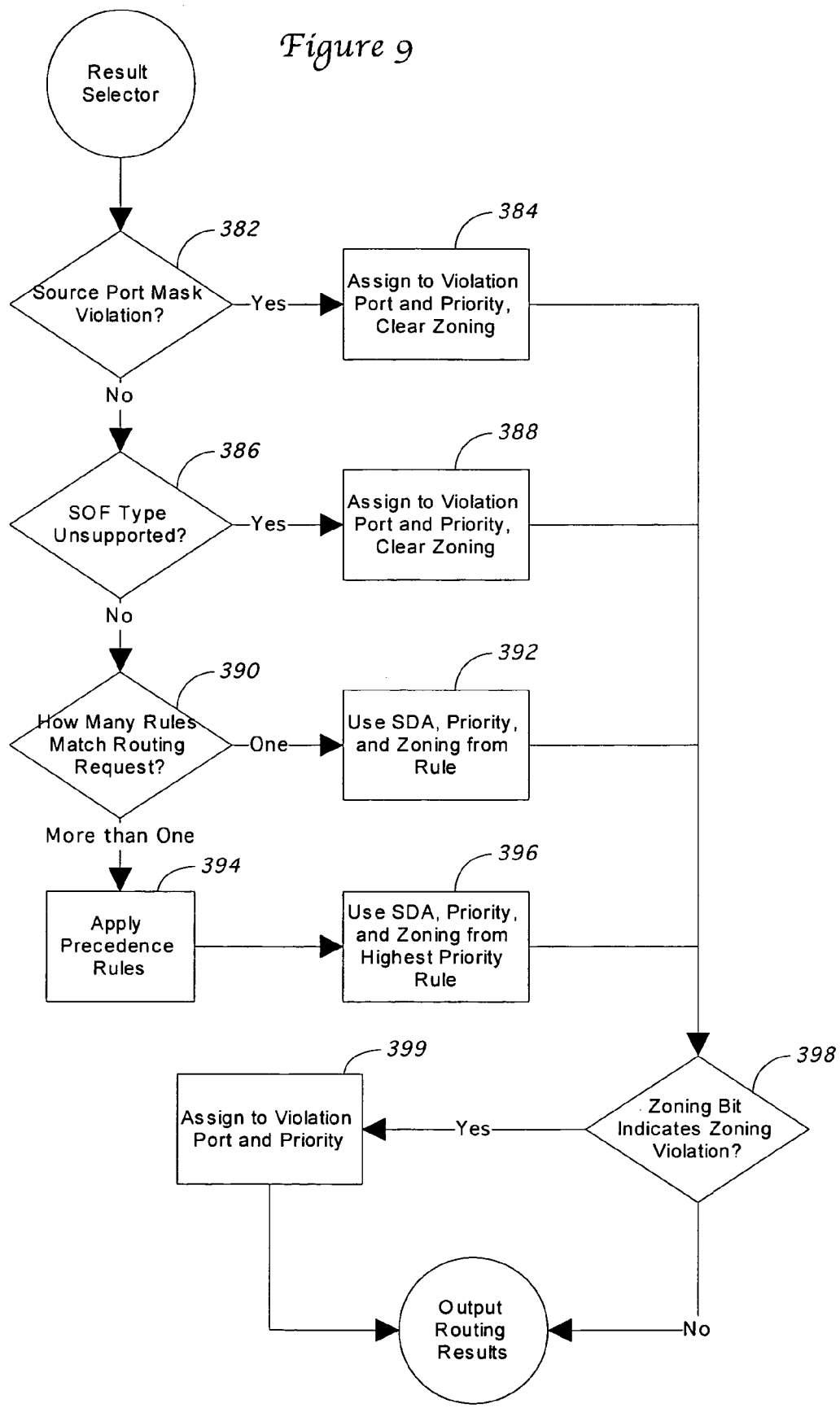
FIG. 9 is a flow chart showing a process used in one embodiment of a result selector found in the primary router of FIG. 8.

The result selector 380 examines the outputs of all of the routing rules 320-370, and chooses a switch destination address 206, out-of-band priority, and zoning indicator for each routing request according to the rules set forth in FIG. 9. As shown in this flow chart, the first step 382 is to determine if the split region routing rules 320 indicated a source port mask 326 violation. If so, the result selector 380 assigns the routing result's switch destination address to the violation switch destination address 206 selected by the processor 124, and assigns a predetermined out-of-band priority level and a zoning indicator of one as seen in step 384. If there is no source port mask 326 violation, the routing selector 380 determines if the routing request's SOF type is not supported by the switch 100 at step 386. For example, switches 100 often do not support Class 1 or Class 4 Fibre Channel frames. If the frame is not supported, the result selector 380 assigns the routing result's switch destination address to the violation switch destination address, and assigns a predetermined out-of-band priority level and a zoning indicator of one, as indicated in step 388.

If neither test 382 nor test 386 is positive, step 390 determines if the routing request 260 matches exactly one routing rule 320-370. If so, the result selector 380 uses the switch destination address 206, out-of-band priority, and zoning indicator from the matching rule 320-370 in step 392. If the routing request 260 matches more than one routing rule 320-370, the result selector 380 applies the following priority list in step 394 (from highest priority to lowest):

the split region routing rules 320 (with rule zero having the highest precedence),
the broadcast routing rule 370,
the well-known address routing rule 340, domain controller routing rule 350, and multicast routing rule 360 (which are mutually exclusive), and
the lumped region routing rule (every frame matches this rule).

The highest priority rule then determines the switch destination address 206, out-of-band priority, and zoning indicator in step 396.

After choosing the switch destination address 206, out-of-band priority, and zoning indicator, the result selector 380 examines the zoning indicator in step 398. If the zoning indicator is zero, this means there is a zoning violation. At step 399, the result selector 380 changes the switch destination address to the violation switch destination address and changes the out-of-band priority to a predetermined level.

The output of the result selector 380 is the routing result's switch destination address 302, an out-of-band priority 304. The result selector 380 also creates the routing reason code 306, according to a predefined definition. The output of the result selector 380 is the output of the primary router 280, which is then submitted to the ISL group router 400.

8. ISL Group Router 400

When one switch 100 sends traffic to another switch 100 through an ISL group 108, the ISL group router 400 helps balance the traffic across the various interswitch links 104 in the ISL group 108 (load balancing), while ensuring that all frames belonging to a single exchange are sent over a single interswitch link 104. The ISL group router 400 supports eight different ISL groups 108, with an unlimited number of physical interswitch links 104 in each group 108. Other embodiments could easily support thirty-two or even one hundred twenty-eight ISL groups 108 without any change in the size or apportioning of the switch destination addresses 206.

The processor 124 programs the primary router 280 to recognize routing requests 260 for frames that should travel through one of the eight ISL groups 108, and to map each of those routing requests to an ISL group switch destination address 212. Any number of primary router entries can point to one of the ISL groups 108. An ISL group switch destination address 212 identifies which of the eight ISL groups 108 should carry the frame out of the switch 100.

In the preferred embodiment, the ISL group router 400 balances traffic across the links in an ISL group 108 based on the traffic's source port 112. Each IRM 200 serves four source ports 110, so every routing request 260 comes from one of four possible sources. After the primary router 280 tags a routing result with an ISL group switch destination address 212, the ISL group router 400 chooses a new ISL or E_Port switch destination address 208 for the routing result based on its source port 112. The preferred embodiment uses a simple mapping table that directly assigns a specific ISL port address 208 for each possible source port/ISL group pairs.

Other techniques for load balancing across an ISL group 108 would be possible with the current invention, and would be clear to those of ordinary skill. For instance, the Fibre Channel S_ID, D_ID, OX_ID, or any combination of these elements could be used as a key to a hash function that would be used to select a physical port switch destination address 208 for a particular ISL group (or for an ISL group/source port 112 combination). It would also be possible to subject these elements to a mask that would allow the processor 124 to set certain bits in these elements as "don't care" or "ignored" bits. One constant in all these techniques is that all frames belonging to an individual exchange will be sent over the same physical interswitch link 104.

The processor 124 configures the mapping between source port/ISL group pairs and the selected E_Port in the ISL group router 400. For each of the eight ISL groups 108, the processor 124 provides four switch destination addresses 208, one for routing requests from each source port 112. Each of these addresses is the switch destination address 208 of a destination E_Port. By programming all of the ISL group routers 400 in the switch, the processor 124 can choose an ISL 104 for each source port/ISL group combination.

Figure 10:
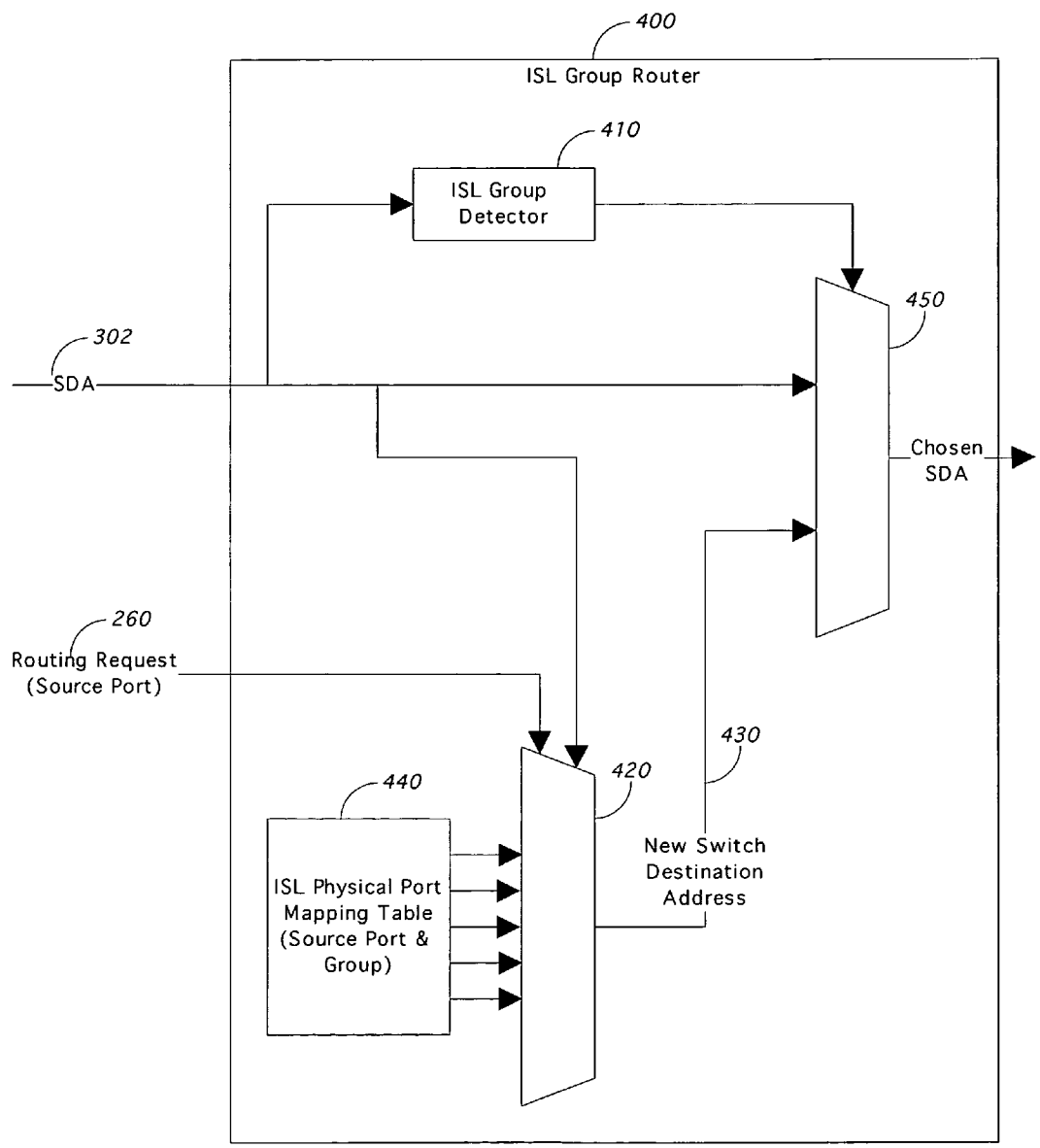
FIG. 10 is a block diagram of the ISL Group Router found in the inbound routing module shown in FIG. 4.

FIG. 10 shows a block diagram for the ISL group router 400. The ISL group detector 410 reads the switch destination address output 302 from the primary router 280. In the preferred embodiment, when the three most significant bits in address 302 are set to 110, the switch destination address 212 is an ISL group 108. Hence, ISL group detector 410 need only look at the three most significant bits in address 302 to make its determination.

Meanwhile, the ISL group address redirector 420 reads three bits (bits 6:4 in the preferred embodiment) from the switch destination address 302 that distinguish between the eight possible ISL groups 108. The redirector 420 combines this information with source port information from the routing request 260 to determine a new switch destination address 430 for an individual ISL 104 using mapping table 440. A selector 450 under the control of the ISL group detector 410 then chooses between the switch destination address 302 created by the primary router 280 and the switch destination address 430 created by the redirector 420. The ISL group router 400 does not alter the priority or zoning that was assigned to the frame by the primary router 280.

9. Priority Combiner 500

The priority combiner 500 examines each routing result's switch destination address 302, in-band priority level, and out-of-band priority level 304, and assigns a single final priority level. If out-of-band priority has been enabled, either by having the bit set in the routing table or by the hardware forcing a priority level due to an error, the final priority level will be the out-of-band priority level 304. If out-of-band priority 384 is not enabled, the final priority level will be the in-band priority level.

10. Output Sorter 600

The output sorter 600 is responsible for routing the routing result from the rest of the inbound routing module 200 and delivering it to the MCM 156 for the input port 112. The routing result delivered to the MCM 156 contains the following elements: i) the switch destination address 206 for the output port 114, ii) the three-bit final priority level, iii) a seven-bit reason code, which indicates which indicates why the IRM 200 routed the frame to its destination, iv) the frame's location in credit memory 154, taken directly from the routing request 260, and v) the frame's one-bit CRC regeneration flag, also taken directly from the routing request.

The present invention is not to be limited to all of the above details, as modifications and variations may be made without departing from the intent or scope of the invention. Those skilled in the art will appreciate that the basic conception of this invention may be utilized for designing future electronic products including new communication devices and switches. Consequently, the invention should not be limited by the specifics of the above description, but rather be limited only by the following claims and equivalent constructions.

What is claimed is:

1. A method for routing data within a switch to a destination port, the data having a destination identifier with a region address portion and a port address portion, the method comprising:
 a) applying multiple routing rules to the data in parallel, each rule determining whether the rule applies to the data by examining the destination identifier, and determining a routing result for the data, the routing result including an address for internal routing within the switch, a priority value for the routing request, and a zoning determination, the multiple routing rules include the following rules:
  i) a plurality of split region rules, each rule applying to a specific region, wherein
   (1) each split region rule is determined to apply by examining the region address portion of the destination identifier, and
   (2) each split region rule determines the routing result by examining a routing table using the port address portion of the destination identifier as an index to the table, and
  ii) a single lumped region rule that applies to all data, wherein the lumped region rule determines the routing result by examining a routing table using the region address portion of the destination identifier as an index to the table; and
 b) selecting a preferred result from among all of the results obtained from the multiple routing rules.

2. The method of claim 1, further comprising:
 c) determining whether the address for internal routing in the preferred result is assigned to an grouping of inter-switch links, and, if so, using a first portion of the address for internal routing and an indicator as to a source port for the data as an index to an ISL group routing table, the ISL group routing table then assigning a new address for internal routing based upon that first portion and that source port.

3. The method of claim 1, further comprising:
 c) after selecting a preferred result, assigning a violation port address as the address for internal routing if the zoning determination in the result indicates a zoning violation.

4. The method of claim 1, wherein the step of selecting a preferred result includes
 i) determining how many rules are determined to apply to the data,
 ii) if only one rule applies, accepting the routing result from the one applicable rule, and iii) if more than one rule applies, applying a precedence analysis and accepting the routing result from the highest priority rule that applies to the data.

5. A method for routing data in a switch comprising:
a) receiving the data over an input port;
b) submitting to a routing module a destination identifier for the data and a type value indicating a protocol used by the data;
c) creating a protocol index based upon the type value;
d) using at least a portion of the destination identifier to look up a routing information entry in a routing table, the routing information entry having:
  i) a single destination port identifier for all type values;
  ii) a plurality of zoning indicators, at least one zoning indicator for each type value;
e) using the single destination port identifier for the routing of the data;
f) using the protocol index to select the zoning indicator within the routing information entry; and
g) using the zoning indicator to perform zoning in the switch.

6. A method for routing data in a switch comprising:
a) receiving the data over an input port, the input port sharing a routing module with a plurality other ports;
b) submitting to the routing module a destination identifier for the data, type value indicating a protocol used by the data, and a source port identifier indicating the input port;
c) creating a protocol index based upon the type value; d) using at least a portion of the destination identifier to look up a routing information entry in a routing table, the routing information entry having:
  i) a single destination port identifier for all ports that share the routing module,
  ii) a plurality of zoning indicators, at least one zoning indicator for each type value, and
  iii) a plurality of priority fields, at least one priority field for each port sharing the routing module;
e) using the single destination port identifier for the routing of the data;
f) using the protocol index to select the zoning indicator within the routing information entry;
g) using the zoning indicator to perform zoning in the switch; and
h) using the source port identifier to select the priority field for the input port, and using the selected priority field contents as the priority for the data.

7. The method of claim 6, further comprising:
i) transmitting the data over an interswitch link using one of a plurality of virtual channels that exist on the link, the one virtual channel being determined by the priority for the data.

8. The method of claim 6, wherein the routing information entry further comprises a plurality of destination enable bits, one for each port sharing the routing module, wherein the destination enable bits are used to determine whether a particular destination is enabled for a particular input port.

* * * * *

UNITED STATES PATENT AND TRADEMARK OFFICE
CERTIFICATE OF CORRECTION

| | | |
|---|---|---|
| PATENT NO. | : 7,623,519 B2 | Page 1 of 1 |
| APPLICATION NO. | : 10/873547 | |
| DATED | : November 24, 2009 | |
| INVENTOR(S) | : Anthony G. Tornetta et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1401 days.

Signed and Sealed this

Ninth Day of November, 2010

David J. Kappos
*Director of the United States Patent and Trademark Office*